United States Patent [19]
Leonard

[11] 3,909,398
[45] Sept. 30, 1975

[54] BONE DROPOUT PAN

[75] Inventor: Gordon C. Leonard, Dalton, Ga.

[73] Assignee: Meat Separator Corporation, Dalton, Ga.

[22] Filed: Oct. 16, 1973

[21] Appl. No.: 407,018

[52] U.S. Cl. .................. 209/156; 209/13; 209/458
[51] Int. Cl. ............................................. B03b 3/04
[58] Field of Search ........................... 209/155–157, 209/18, 13, 423, 454, 461, 458, 44, 10, 3

[56] References Cited
UNITED STATES PATENTS

| | | | |
|---|---|---|---|
| 128,404 | 6/1872 | Lathrop | 209/156 |
| 170,978 | 12/1875 | Allain | 209/45 X |
| 881,526 | 3/1908 | Yount | 209/458 |
| 919,246 | 4/1909 | Ross | 209/156 |
| 1,072,448 | 6/1928 | Clouwez | 209/18 X |
| 1,216,798 | 2/1917 | Green | 209/44 |
| 1,352,882 | 9/1920 | Donegan | 209/18 |
| 2,015,522 | 9/1935 | Hoffman | 209/458 X |
| 2,071,320 | 2/1937 | Coberly | 209/156 |
| 3,387,706 | 6/1968 | Bailey | 209/155 |
| 3,403,781 | 10/1968 | Drago | 209/458 X |
| 3,509,997 | 5/1970 | Tomlinson | 209/458 |

Primary Examiner—Robert Halper
Attorney, Agent, or Firm—A. Yates Dowell, Jr.

[57] ABSTRACT

Apparatus for separating bone fragments from meat having a slight difference in specific gravity. The apparatus includes a pan having a slowly moving flow of water and such pan includes a plurality of troughs disposed in a direction generally normal to the flow of water and creating spaced areas of substantially static water into which slivers of bone settle.

3 Claims, 5 Drawing Figures

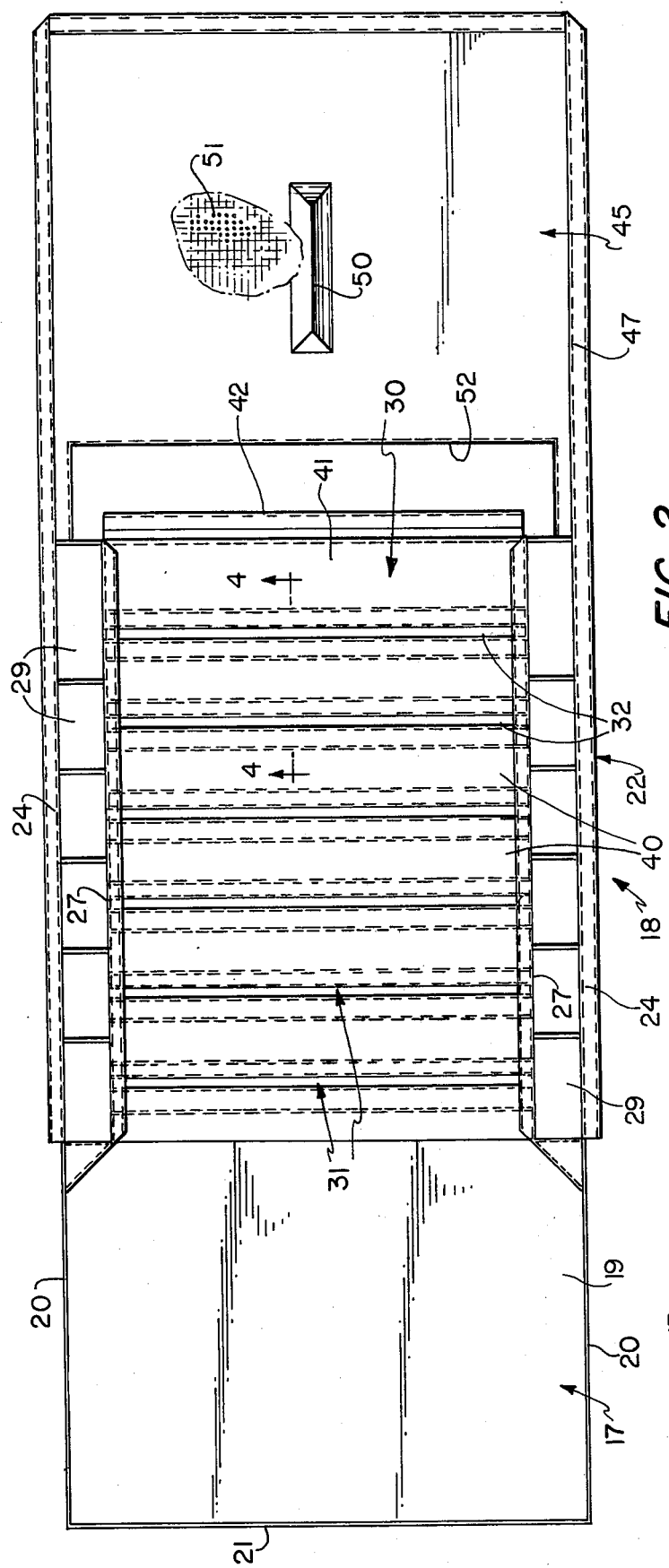
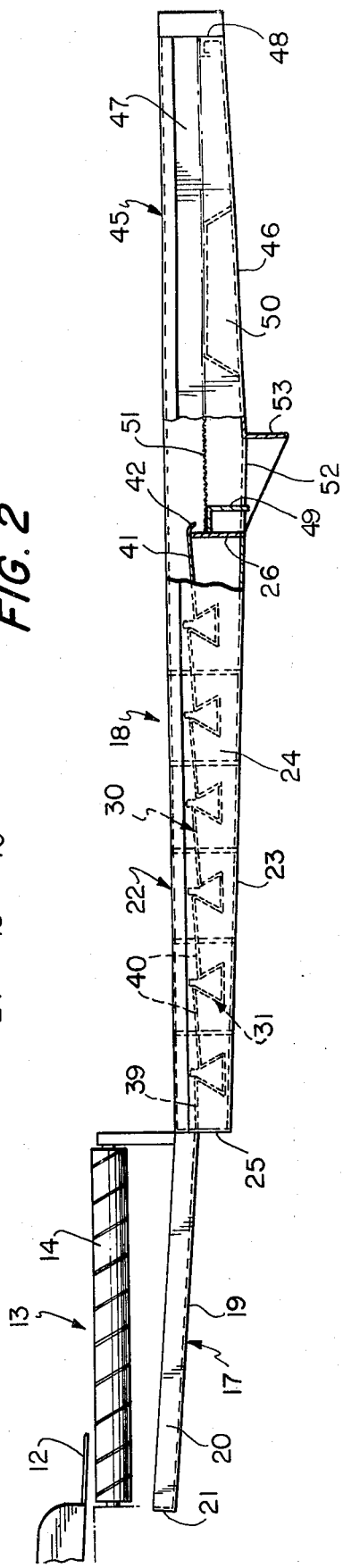
FIG. 2
FIG. 3

BONE DROPOUT PAN

BACKGROUND OF THE INVENTION

1. Field of the Invention

This invention relates generally to the processing of foods of various kinds and relates particularly to the separation of particles of bone and gristle from edible meat such as fowl and the like.

2. Description of the Prior Art

Heretofore many efforts have been made to process food products in which unusable portions of material have been separated from edible material after which the edible material has been packaged for consumption while the unusable portions have been discarded. This process has not been difficult where relatively large pieces of meat have been separated from relatively large bones and pieces of gristle.

In preparing chicken, turkey and other fowl, it is desirable to recover as much meat as is economically feasible and including the meat which is close to the bone such as the meat of the wings, neck and other portions of the fowl in which the meat tends to cling to the bone and gristle.

Many efforts have been made to separate meat from the bones of fowl such as in Zartman U.S. Pat. Nos. 3,017,661 and 3,121,252, as well as Leonard U.S. Pat. No. 3,554,371. In each of these prior art structures pieces of meat were separated from relatively large pieces of bone and gristle. However, the smaller pieces of bone, bone slivers, and gristle were separated by hand as the last step in the process. In these prior art patents the separating was accomplished by water flotation in which the heavier pieces of bone and gristle sank to the bottom of a separating tank, while the meat was discharged over an overflow lip. Most of the bone was successfully separated from the meat by these prior art structures; however, a small portion of fragments and slivers of bone and gristle were discharged with the meat because the separation was based on slight differences in specific gravity. Since water has a specific gravity of 1, poultry meat normally has a specific gravity of 1.1 and the bone and gristle of poultry have a specific gravity of 1.2, some small portion of the material was not separated.

The structure disclosed in Leonard U.S. Pat. No. 3,629,902 was developed to mechanically separate relatively soft pieces of meat from relatively hard fragments of bone and gristle after the material had passed through at least one water flotation device. This structure separated most of the harder materials from the meat by squeezing the meat through adjacent rollers which resisted passage of hard bone and gristle. However, small slivers and other fragments of bone and gristle were still discharged onto the inspection table and were separated by hand.

Structures having areas of static water associated with a flow of rapidly moving water for separating materials of different densities have been known in the prior art, particularly in the separating of valuable ores from earth and water. Some examples of this type of structure are the patents to Coleman U.S. Pat. No. 93,060, Stephens U.S. Pat. No. 167,133, Pagett U.S. Pat. No. 900,581 and Green U.S. Pat. No. 1,216,798. Separating of relatively dense ore from lighter materials has required a swiftly moving flow of water to wash the ore as well as to cause the lighter materials to be separated and discharged while the heavier valuable ore settled to the bottom. A slowly moving flow of water permitted undesirable materials to settle with the desirable materials.

SUMMARY OF THE INVENTION

This invention is embodied in an apparatus through which a slowly moving flow of water is permitted to pass and such apparatus includes a plurality of troughs containing substantially static water so that small pieces of meat having a specific gravity of approximately 1.1 can be separated from small fragments and slivers of bone and gristle having a specific gravity of approximately 1.2 Even though the apparatus is substantially level or tilted downwardly slightly, one trough is connected to the next adjacent downstream trough by an upwardly inclined imperforate portion to induce eddy currents to assist in separating slivers and fragments of bone from the meat so that the bone settles into the troughs, while the meat is discharged from the apparatus.

It is an object of the invention to provide an apparatus for separating materials having slightly different specific gravities as well as to provide an apparatus for separating an edible food product from a non-edible product.

BRIEF DESCRIPTION OF THE DRAWINGS

FIG. 2 is a top plan view of the bone dropout pan of the present invention.

FIG. 3 is a side elevation thereof.

DESCRIPTION OF THE PREFERRED EMBODIMENT

Figure 1:
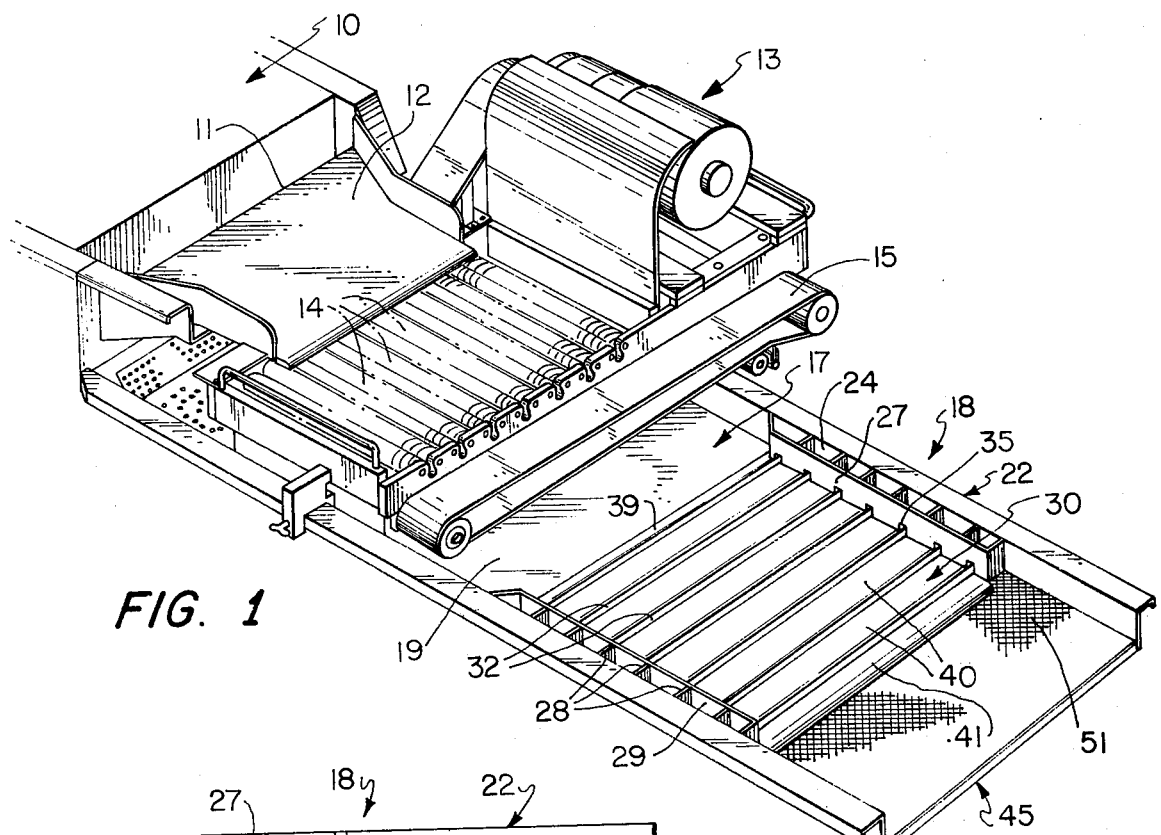
FIG. 1 is a perspective illustrating the device in use.

With continued reference to the drawings, a separation tank 10 similar to Leonard U.S. Pat. No. 3,554,371 is provided for separating relatively large pieces of meat from relatively large fragments of bone and gristle by means of a flow of water having a velocity of from 15 to 22 gallons per minute. The separation tank 10 includes an overflow lip 11 over which the meat is discharged in a flow of water down a chute 12.

At the discharge end of the chute, water and materials carried thereby are discharged onto a mechanical bone and meat separator 13 similar to the Leonard U.S. Pat. No. 3,629,902. The separator 13 includes a plurality of generally parallel rollers 14 which are spaced a slight distance apart and which are adapted to further separate pieces of hard bone and gristle from the softer meat by squeezing the meat between the rollers 14 and discharging bone, gristle and undesirable material from the machine by means of a conveyor 15.

From the separator 13 the meat and some small fragments, grit, and slivers of bone and gristle fall by gravity onto the inlet section 17 of a bone dropout pan 18. The inlet section 17 includes a substantially flat imperforate bottom wall 19, side walls 20, and a front end wall 21 and such inlet section is inclined downwardly from the front toward the rear. The discharge end of the inlet section 17 is connected to a separator section 22 having a bottom 23, side walls 24, a front wall 25 and a rear wall 26. The bottom 23 may be inclined slightly downwardly from front to rear; however, such inclination should not exceed approximately 5° from the horizontal. If desired, such bottom wall could be substantially level. Spaced inwardly from each of the side walls 24 is an inner wall 27 which is generally parallel with the corresponding side wall and each inner wall extends upwardly from the bottom 23 to a position substantially level with the top of the side walls 24. A plurality of partitions 28 extend between the side walls 24 and the inner walls 27 and extend upwardly from the bottom 23 to define a plurality of collection wells 29. If desired, the portion of the bottom 23 located below the wells 29 may be provided with a cleanout door, not shown.

Figure 4:
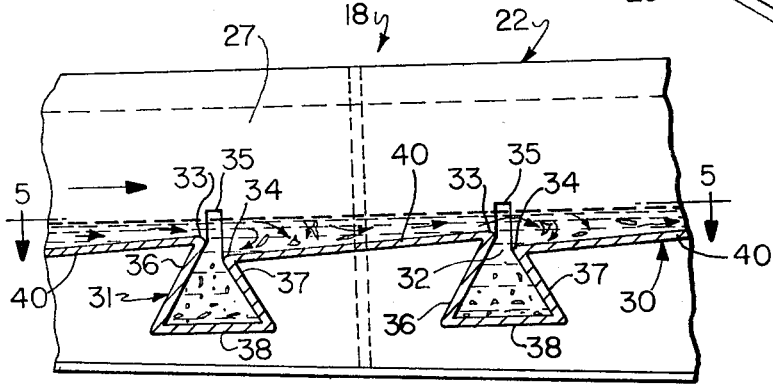
FIG. 4 is an enlarged fragmentary section on the line 4—4 of FIG. 2.
Figure 5:
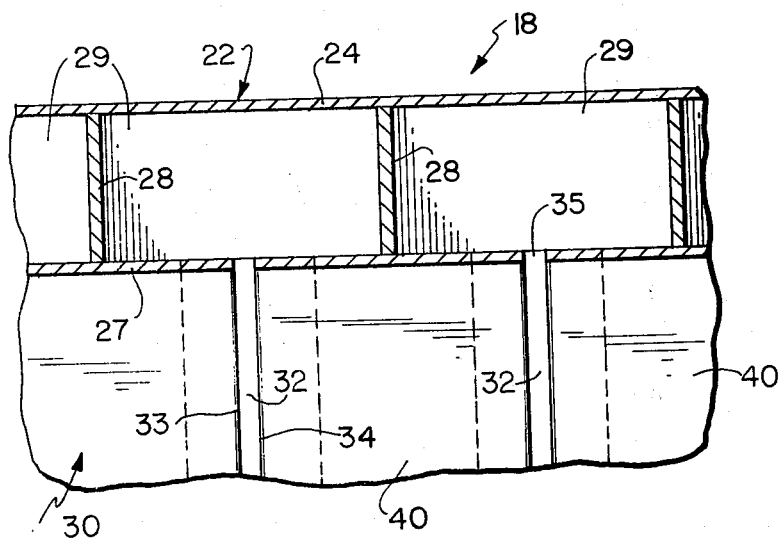
FIG. 5 is an enlarged fragmentary section on the line 5—5 of FIG. 4.

In order to separate pieces of meat from small fragments and slivers of bone and gristle, the separator section 22 is provided with a substantially horizontal disposed bone dropout partition 30 having a plurality of spaced generally parallel troughs 31 extending from one inner wall 27 to the other. Each of the troughs 31 is open at the upper portion defining a mouth 32 having a front lip 33 disposed at a higher elevation than the rear lip 34. With particular reference to FIG. 4, each of the inner walls 27 is provided with an opening 35 complementary with the cross-sectional configuration of the troughs 31 and providing communication between such troughs and the wells 29.

As illustrated, the troughs 31 are generally triangular in cross-section with a front wall 36 and a rear wall 37 connected by a bottom wall 38. However, it is contemplated that such troughs could be of any other desired configuration including substantially round with an open top or of any other polygonal cross-section.

The partition 30 includes a front portion 39 connected along one edge to the bottom wall 19 of the section 17 in any desired manner, as be welding or the like, and connected along the opposite edge to the front lip 33 of the forwardmost trough. The rear lip 34 of one trough is connected to the front lip 33 of the next adjacent rearward trough by an imperforate connecting member 40. Since the rear lip 34 is lower than the front lip 33 of each trough, the connecting members 40 are inclined slightly upwardly from front to rear. The rear lip 34 of the rearmost trough 31 is connected to a discharge chute 41 having a downwardly curved lip 42 which extends over the rear wall 26 of the separator section 22.

Rearwardly of the separator section 22 the dropout pan 18 is provided with a discharge section 45 including a bottom wall 46, side walls 47 and a rear wall 48. A rearwardly extending flange or shoulder 49 is attached to the rear wall 26 of the separator section 22 and extends into the discharge section at an elevation substantially level with the top of the rear wall 48. A support member 50 is located generally centrally of the bottom wall 46 and such member supports the central portion of a screen 51, the opposite ends of which are supported by the flange 49 and the rear wall 48. The bottom wall 46 of the discharge section 45 is inclined upwardly from front to rear so that water falling through the screen 51 gravitates toward the front of the bottom wall 46. At the forward portion of the bottom wall 46 an opening 52 is provided and if desired such opening may be substantially surrounded by a downwardly extending flange 53.

In the operation of the device, pieces of meat and small fragments of bone and gristle which are discharged through the rollers 14 fall onto the inlet section 17 of the dropout pan 18 and water which is discharged from the chute 12 washes such pieces of meat and other material down the inclined inlet section into the separator section 22. Since the dropout pan 18 is substantially level, the water, which is flowing at a rate of approximately 15 to 22 gpm, fills the troughs 31 and the wells 29 and maintains a mean depth of approximately ¼ to ⅜ inch above the dropout partition 30. The water within the troughs 31 and wells 29 remains substantially static, while the water above the dropout partition moves relatively slowly. Due to the configuration of the mouth 32 of each trough and the connecting members 40 between the troughs, an eddy current is induced in the area of the mouth of each trough.

The slowly moving water carries the meat and particles of bone and gristle along the dropout partition and as the portions of meat, bone and gristle pass over the front lip 33 of each trough, the eddy currents cause the grit and fragments of bone and gristle to separate from the meat. The slightly heavier fragments of bone and gristle settle into the static water within the troughs 31, while the pieces of meat are carried by the flow of water up the connecting member 40 and over the lip of the next adjacent through. After the meat has passed over the last trough, substantially all of the fragments of bone and gristle have been separated from the meat and have sunk to the bottom of the static water in the troughs, while the meat has been discharged over the lip 42 onto the screen 51 of the discharge section 45. The screen 51 retains the pieces of meat, while the water passes through the screen where such water gravitates down the bottom wall 46 and is discharged through the opening 52. If desired, an inspector may be located at the discharge section to remove pieces of meat from the screen as well as to examine such meat for any small fragments of bone and gristle which may still cling to the meat, although in practice very few if any pieces of bone are discharged onto the screen 51.

Perodically the fragments of bone and gristle can be removed from the troughs 31 without interrupting the treating process by inserting a small instrument (not shown) into the mouth of each trough and slowly moving the instrument laterally of the dropout pan to cause the particles of bone and gristle to be discharged from the trough into the adjacent well 29. Since most of the particles of bone and gristle have been removed before the material reaches the dropout pan, it is necessary to clean the wells 29 only at periodic intervals, such as the lunch break or at the end of a shift.

I claim:

1. The method of separating meat from bone fragments having slight differences in their respective specific gravities comprising the steps of providing a pan having a plurality of substantially horizontally disposed troughs extending from side to side and partitions intermediate said troughs causing water having the meat and bone fragments entrained therein to flow slowly over said pan in a direction normal to said troughs so as to maintain a mean depth of water of approximately ¼ to ⅜ inches above said partitions, creating eddy currents in said water in the area of the mouth of each of said troughs for both separating the meat from the bone fragments and guiding the bone toward one of said troughs, permitting the water within each of said troughs to remain substantially static so that the heavier bone fragments sink into said troughs while the lighter meat is carried along by the flow of water, separating the meat from the flow of water, and discharging the water from said pan.

2. A bone dropout pan for separating bone fragments from meat in which the bone and meat have specific gravities which are slightly different from each other and slightly different from water, comprising an inlet section for receiving pieces of meat and bone, a separator section associated with said inlet section for receiving meat and bone therefrom, partition means located within said separator section, means for slowly introducing a substantially constant flow of water along said partition means so as to maintain a mean depth of water of approximately ¼ to ⅜ inches above said partition means, said partition means being generally horizontally disposed and including a plurality of downwardly extending troughs located generally normal to the direction of flow of the water, each of said troughs having spaced generally parallel front and rear lips defining an opening for receiving water and other materials, the front lip of each trough being located upstream of and at a higher elevation than the corresponding rear lip so that eddy currents are created in the water passing over the mouth of each of said troughs and thereby causes separation of the bone from the meat, said partition means including an imperforate upwardly inclined connecting member connecting the rear lip of each trough to the front lip of the next adjacent downstream trough, whereby the bone which settles along said imperforate connecting members is directed toward the adjacent upstream trough, the water in said troughs being substantially static so that the slightly heavier bone sinks by gravity into the troughs while the meat is discharged with the water from said separator section, well means communicating with at least one end of each of said troughs for receiving bone therefrom, and a discharge section located adjacent to said separator section for receiving water and meat therefrom.

3. The structure of claim 2 in which said discharge section includes screen means for separating meat from water, and means for discharging water from said pan.

* * * * *